March 2, 1965     G. A. BARLOW ETAL     3,171,636
TOY
Filed Dec. 13, 1962     3 Sheets-Sheet 1
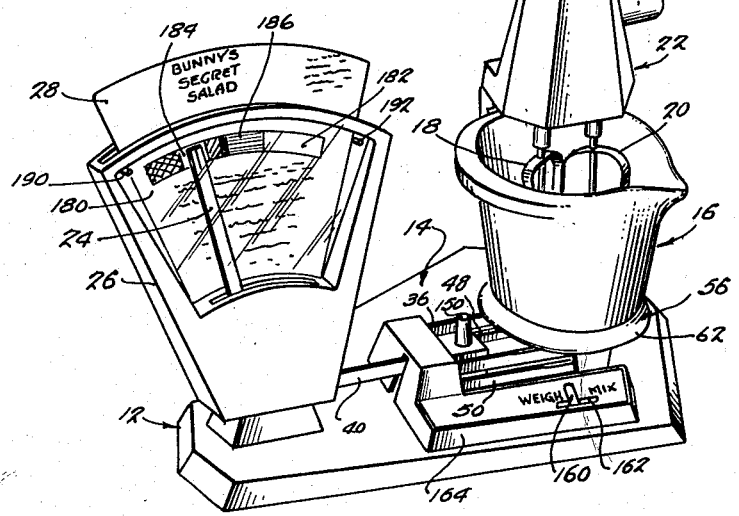
Inventors
GORDON A. BARLOW
NORMAN T. McFARLAND
By Soans, Anderson, Luedeka & Fitch
Attys March 2, 1965　　　G. A. BARLOW ETAL　　　3,171,636
TOY
Filed Dec. 13, 1962　　　3 Sheets-Sheet 2
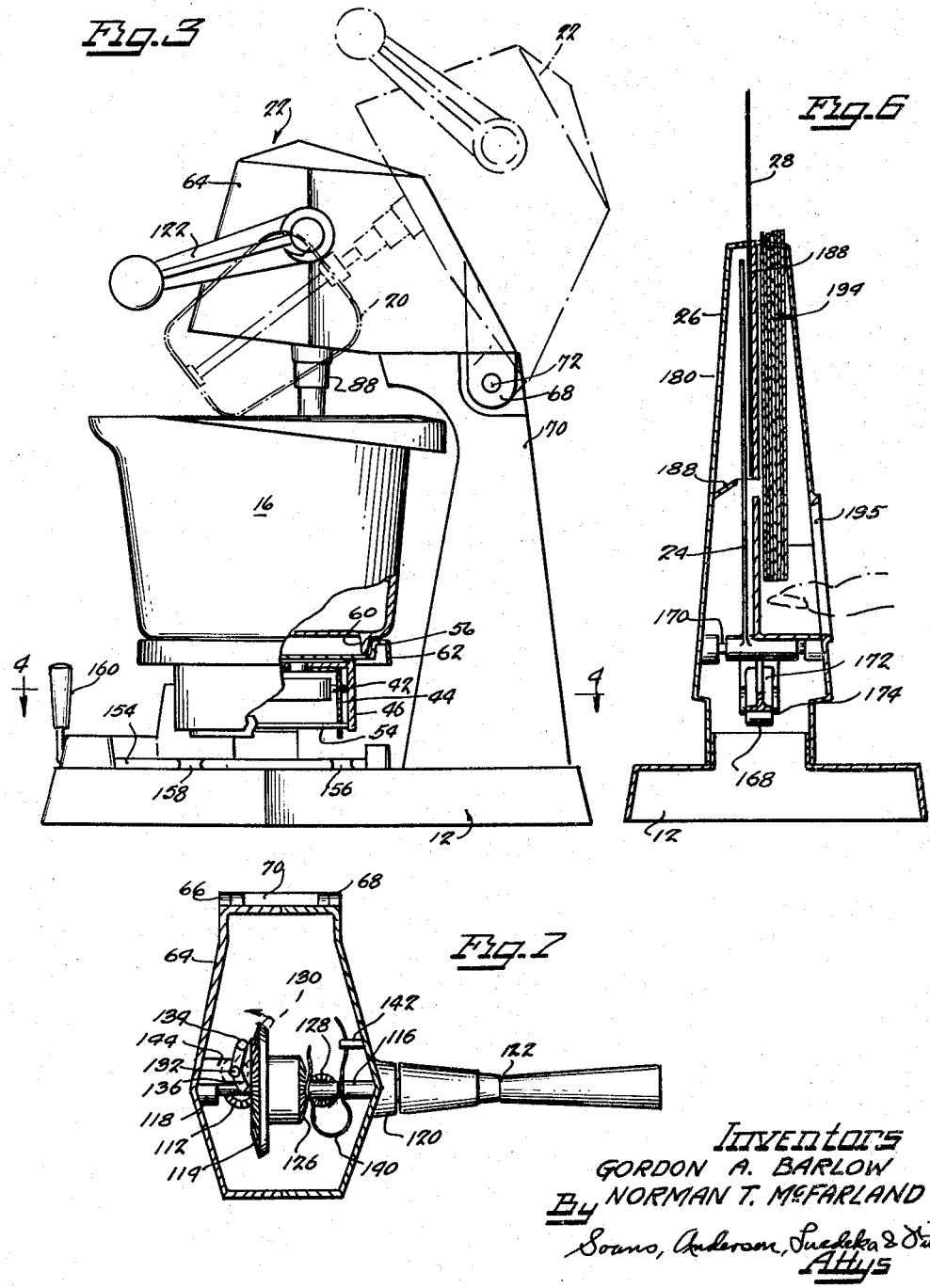
Inventors
GORDON A. BARLOW
NORMAN T. McFARLAND
By Sonns, Anderson, Luedeka & Fitch
Attys March 2, 1965  G. A. BARLOW ETAL  3,171,636
TOY
Filed Dec. 13, 1962  3 Sheets-Sheet 3
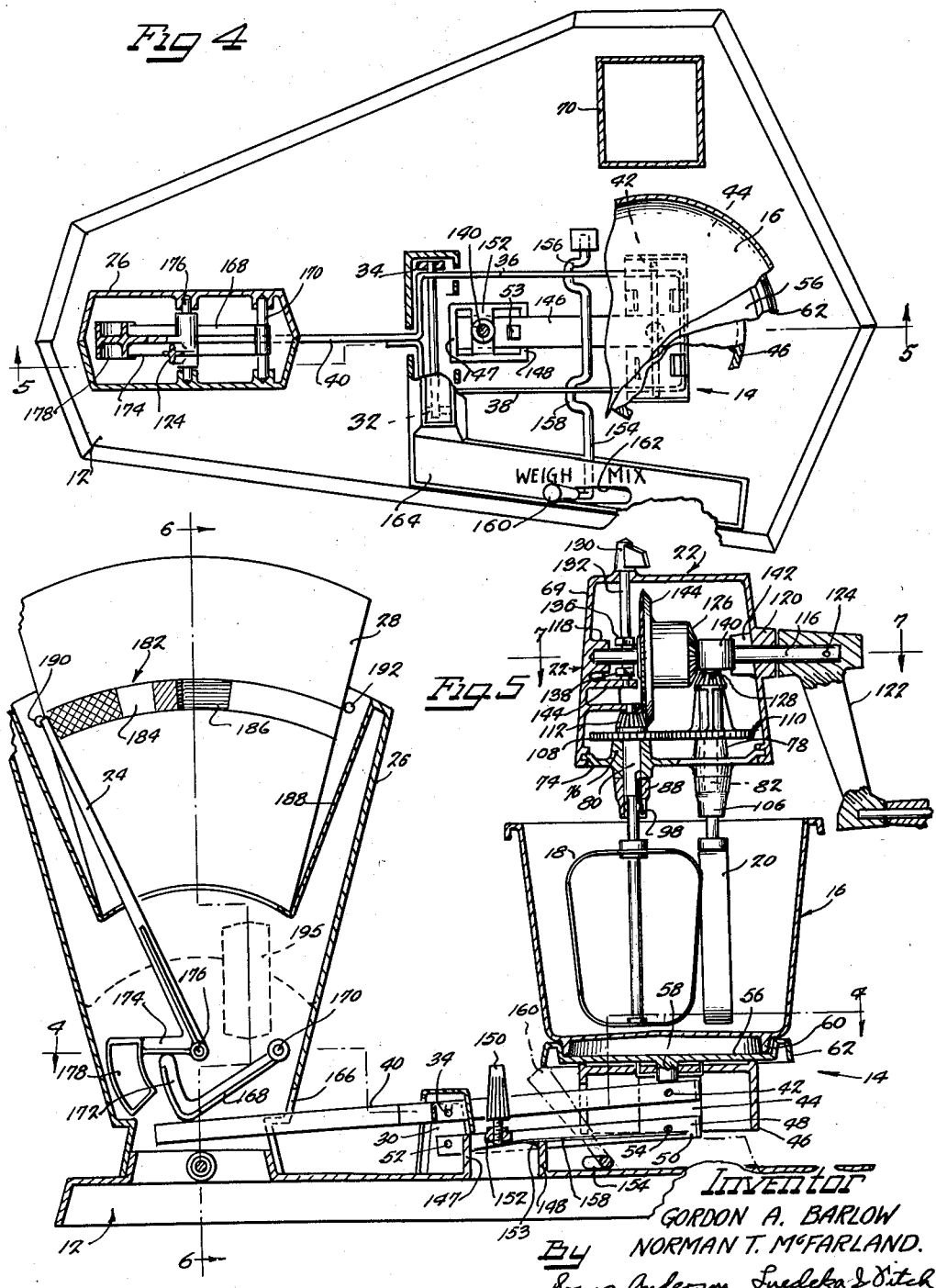
INVENTOR
GORDON A. BARLOW
NORMAN T. McFARLAND.
BY Soans, Anderson, Luedeka & Fitch
Attys United States Patent Office 3,171,636
Patented Mar. 2, 1965

3,171,636
TOY
Gordon A. Barlow, Chicago, and Norman T. McFarland, Mayview, Ill., assignors to Marvin Glass & Associates, Chicago, Ill., a partnership
Filed Dec. 13, 1962, Ser. No. 244,365
9 Claims. (Cl. 259—21)

The present invention relates to a toy, and particularly to a toy for girls which enables them to mix cooking recipes quite simply, and an object of the invention is to provide such a toy which will be attractive, which will be inexpensive to construct, and which will be practical enough to continue to hold the interest of the user.

A further object is to provide such a toy, the use of which will reasonably assure the success of the early cooking efforts of a child, and which will avoid the necessity for reading a recipe, measuring ingredients, etc.

A further object is to provide such a device comprising a weighing scale on which a mixing receptacle is mounted, the scale having an indicator in which may be placed a recipe card against which the weight of the mixing receptacle and its contents is shown by a pointer or index, the card having thereon stations identified with the various ingredients, positioned at the locations the pointer will reach when the correct amount of that ingredient has been added to the mixture.

A further object is to provide ready storage for a plurality of recipe cards, which cards are interchangeable with the particular one in use.

A further object is to provide mechanism for mixing the ingredients while the receptacle is in place on the scale, and to stabilize the receptacle as well as to protect the scale mechanism from vibrations incident to the operation of the mixing apparatus.

Further objects and advantages will be apparent from the following specification and annexed drawings in which:

FIGURE 1 is a perspective view of the device in operating condition;

FIGURE 2 is an enlarged rear view in perspective, of a portion of the device shown in FIGURE 1;

FIGURE 3 is an end elevation of the device, enlarged, and with parts broken away and in broken lines;

FIGURE 4 is a horizontal sectional view of the device taken on the line 4—4 of FIGURE 3;

FIGURE 5 is a vertical sectional view of the device taken on the line 5—5 of FIGURE 4;

FIGURE 6 is a vertical sectional view on the line 6—6 of FIGURE 5;

FIGURE 7 is a horizontal sectional view on the line 7—7 of FIGURE 5;

FIGURE 8 is an enlarged detail of a chuck indicated in FIG 5; and

FIGURE 9 is a horizontal sectional view on the line 9—9 of FIGURE 8.

The device as a whole is best shown in FIGURE 1 and includes a base 12 having thereon a scale mechanism generally designated as 14, on which is supported a mixing bowl or ingredient receiving means 16. Beaters 18 and 20 are supported and actuated by an actuating mechanism or beater head 22, which will be further described, and scale mechanism 14 actuates a pointer or index 24 within a housing 26, the pointer cooperating with a recipe card 28 supported in housing 26, and which card is interchangeable with a plurality of others in a manner and for the purpose to be fully described.

Base 12 may be made in any suitable manner of any suitable material, for example, it may be a molded plastic or a metal die-casting, and has a pair of spaced fulcrum supports 30 and 32, FIGURE 4, carrying a shaft or pivot 34 on which are rockably supported the spaced sides 36 and 38 of a loop-like portion of a beam 40 which extends into housing 26 and actuates pointer 24 as will appear, while sides 36 and 38 support bowl 16.

For this latter purpose, a pin 42 extends across between portions 36 and 38 beneath bowl 16 and is engaged in supporting relation with a clip member 44, fixed in any suitable manner to a scale pan 46 so that up-and-down movement of pan 46 will be accompanied by rocking of beam 40. For stability of pan 46, parallel links 48 and 50, FIGURES 5 and 1, are fulcrumed on a pin 52 and pivoted by means of a pin 54, to pan 46, so that the latter will remain level as it moves up and down, and so that distribution of material in bowl 16 will not affect the reading of the scale. Pan 46 carries a table 56 having a stud 58 pivoted in the pan and about which table 56 may rotate in well-known manner while mixing is being done. Bowl 16 preferably has a base flange 60 which fits within a rim 62 on table 56 to prevent inadvertent displacement of the bowl.

Actuating mechanism 22 comprises a housing 64 having spaced ears 66 and 68 (see also FIGURES 3 and 7) which extend downwardly along side a pedestal 70 and are pivoted thereto on a pin 72 so that housing 64 may be pivoted upwardly to the dotted position in FIGURE 3. In this position, housing 64 is clear of bowl 16 so that ingredients may be added, and beaters 18 and 20 are clear of the bowl to permit removal of the bowl from table 62. Housing 64 has a bottom wall or cover plate 74 fixed thereto in any suitable manner and which supports bearings 76 and 78 carrying shafts 80 and 82 disposed generally vertically, and which actuates beaters 18 and 20 respectively.

Beaters 18 and 20 are readily removable for cleaning, etc. As best shown in FIGURES 8 and 9, each of shafts 80 and 82 extends downwardly through its bearing and has a bore 84 into which extends a shank as 86, of beater 18. Shaft 80 has fixed thereon in any suitable manner a chuck member 88 which has a bore 90 to receive shank 86, and which is slotted at 92 to receive ears 94 and 96 formed on shank 86. In this way, rotation of shaft 80 is positively transmitted to shank 86. A spring finger 98 is engaged between shaft 80 and chuck 88, and has a reentrant detent portion 100 which presses against ear 96 to yieldingly maintain shank 86 in bore 84 and chuck 88. Finger 98 also has a transverse tongue 102 embedded in or otherwise engaged with chuck 88, and shaft 80 has a flat 104 to provide space within the chuck for the thickness of finger 98. In this way, finger 98 acts, in addition to its capacity as a detent, as a key to insure rotation of chuck 88 with shaft 80. Beater 18 may be removed or replaced at any time by merely forcing either of ears 94 and 96 past detent portion 100, spring finger 98 being made stiff enough to retain shank 86 in place as long as desired.

A similar chuck construction 106 is used for beater 20 and, therefore, it is considered unnecessary to describe the latter in detail.

Shaft 80 has fixed thereon, inside of housing 64, a gear 108, and shaft 82 has a similar or identical gear 110, meshed with gear 108 so that shafts 80 and 82 will be forced to rotate in opposite directions in timed relation. Since beaters 18 and 20 can be installed in only predetermined relation to shafts 80 and 82, and since chucks 88 and 106 are properly oriented when the device is assembled, the beaters will always be properly timed when inserted in the chucks.

As seen in FIGURE 5, shaft 80 is driven by a bevel gear 112 fixed thereon above gear 108, and engaged with a bevel gear 114 fixed on a shaft 116 journalled substantially horizontally in housing 64 in bearings 118 and 120, and having a crank 122 fixed thereon outside of housing 64 by means such as a pin 124. Turning the crank will therefore rotate beater 18, and through gears 108 and 110, beater 20. Gear 114 is considerably larger than gear 112, so that the beaters will operate at a high rate of speed. They may be operated at a lower speed with additional force or torque by shifting shaft 116 axially so as to engage a gear 126 with a gear 128 on shaft 82, at the same time disengaging gears 114 and 112. Such shifting is effected by turning a lever or handle 130 counterclockwise, as seen from above. Handle 130 is fixed on a shaft 132 journalled in housing 64 and having an offset portion 134 connecting fingers 136 and 138 with each other and with shaft 132. In the position of the parts shown in FIGURES 5 and 7, fingers 136 and 138 are inactive and gear 114 is held in mesh with gear 112 by the action of a generally U shaped spring 140. Spring 140 bears against, and is prevented from rotating with shaft 116, by a boss 142, and also bears against the face of gear 126, urging the latter continually toward the left, as seen in FIGURES 5 and 7, and maintaining the engagement of gear 114 with gear 112. When handle 130 is turned, as stated, fingers 136 and 138 are turned to press against the left face of gear 114 and shift it to the right, compressing spring 150 and engaging gear 126 with gear 128. This movement also disengages gear 114 from gear 112. Fingers 136 and 138 are of such a shape that they will be held in position by the leftward pressure of gear 114 urged by spring 140, and will act as a suitable thrust bearing against the spring pressure. Shaft 132 is supported against deflection by a bearing portion formed or fixed on the inner wall of housing 64 and designated as 144.

The weight imposed upon scale pan 46 is counterbalanced by a leaf spring 146 (FIGURE 5) fulcrumed on a rib 148 on base 12, and pressing upwardly against above mentioned pin 54. At its other end spring 146 is engaged with a rib 147 which prevents displacement to the left in FIGURE 5, and by a downwardly pressing adjusting screw 140 threaded into a supporting portion 152 fixed in relation to base 12, so that the downward pressure of screw 150 can be adjusted to distort spring 146 the right amount to balance the weight of pan 46 and its attached parts. Spring 146 has a tongue 153 engaging rib 148 to prevent displacement of the spring to the right. Spring 146 will yield in proportion to the weight imposed, and which action will allow downward movement of scale pan 46. This movement is utilized in the indicating mechnaism to be described presently.

In order to prevent such movement while mixing is going on, and to protect or shield the scale mechanism from vibration and unnecessary wear, a supporting shaft 154 is suitably journalled on base 12 beneath links 48 and 50 and has offset portions 156 and 158 (FIGURE 4), which in one position lie on the surface of base 12, but which may extend upwardly upon rotation of shaft 154 a predetermined amount, so as to raise links 48 and 50 and relieve fulcrum pin 34 of the weight of pan 46. In this way, the scale mechanism is isolated from the vibrations caused by the mixing operation. Shaft 154 may be so rotated by means of a lever 160 which travels in a slot 162 in a housing 164 which also encloses fulcrum parts 30, 32 and 34. The ends of slot 162 limit the travel of lever 160 and determine the active and inactive positions of offset portions 156 and 158. Housing 164 preferably has legends thereon indicating the active and the inactive positions of lever 160, as "Weigh" and "Mix," respectively.

It will now be apparent that an arrangement has been provided wherein a batch of ingredients may be mixed, which will sense the weight of such ingredients, and in which the sensing mechanism may be disabled and protected from vibration and excessive wear.

Beam 40 extends through a slotted opening 166 (FIGURE 5), into the lower portion of above mentioned housing 26, and moves upwardly upon downward movement of pan 46 into contact with a downwardly inclined L shaped lever 168 fulcrumed on a pin 170 carried in housing 26 and having an upwardly directed finger 172. Finger 172, under the urging of beam 40 presses upwardly against a generally horizontal arm 174 of above mentioned pointer 24, the latter being journalled on a pin 176, also carried in housing 26. Arm 174 has a weight 178 which urges pointer 24 continuously toward the left in FIGURES 1, 4 and 5, until overcome by upward movement of beam 40 and lever 168 by reason of downward movement of pan 46, caused by increasing weight in bowl 16. Such movement of pointer 24 will be in proportion to the weight in bowl 16, and can be utilized to measure the quantities of ingredients as they are added to bowl 16.

Recipe card 28 is in the shape of a segment of a circle with a substantial part of the center removed, and is supported in housing 26 in juxtaposition to pointer 24, which preferably has a transparent portion, opening, or window 180 through which pointer 24 and card 28 may be observed. Card 28 may carry as much information as desirable about the particular article or product which is to be mixed, but primarily it has a path or dial portion 182 registering with a portion of pointer 24 and having a series of stations 184, 186, etc., which are preferably of different colors, and which are designated or identified with the names of the several ingredients of the particular recipe carried by the card, and in the order in which the ingredients would be added. These stations are so located on the card that pointer 24 will reach them successively as each ingredient is being added, when the correct quantity of that particular ingredient has been reached. At that point, lever 160 is shifted to "Mix," and crank 122 is turned for the length of time indicated for that particular ingredient. Card 28 rests on a portion of an inner partition portion 188, and on spaced studs 190 and 192.

Additional recipe cards as 194 are stored in housing 26 on the opposite side of partition 188 from card 28. Such cards, not being supported other than at their side edges, come to rest considerably lower down in housing 26, as their side edges engage the side edges of the interior of housing 26. In fact, the tops of such cards come substantially flush with, or a little below, the top of housing 26, and to facilitate removal of such cards, a finger opening 195 (FIGURE 2) is provided in the back of housing 26, which opening is so disposed as to register with and to expose a portion of the lower edges of the cards. By inserting a finger, the cards may be raised so that they are accessible from above.

If pointer 24 does not register properly with the stations 184–186 on card 28, the condition can be readily corrected by adjusting screw 150 until pointer 24 points to zero or to some suitable check point when the bowl is empty, or loaded with some known weight of material.

The operation of the device is thought to be clear from the foregoing description, but it should be noted that use of the device does not require great fluency in reading, if the child is capable of reading the names of the ingredients, it being entirely practical for her to mix recipes of considerable complication. In some instances, it is possible to recognize the ingredients merely by the colors of the stations 184–186 and, with the sole condition that the materials are taken in the right order, the amounts will be correct when the pointer reaches the station indicating that ingredient.

Since food products mixed by the toy are likely to be proportioned accurately enough to come out well time after time, the child using the toy is apt to be encouraged, and her interest in cooking and in the toy is likely to be maintained over a long period.

What is claimed is:

1. A mixer balance toy comprising the combination of a weighing scale, a mixing bowl on said scale, beater means extending into said mixing bowl, a recipe card, a pointer movable adjacent said card, means connected with said pointer and with said weighing scale to move said pointer by reason of movements of said scale, said recipe card having stations corresponding with the positions of said pointer and identified with the several ingredients in a recipe and including instructions relative to the mixing operations required by the recipe, each of said stations being positioned to register with said pointer when the correct amount of the ingredient identified by the particular station has been added to the mixing bowl.

2. A mixer balance toy comprising the combination of a weighing scale, a mixing bowl on said scale, beater means extending into said mixing bowl, a recipe card, a pointer movable adjacent said card, means connected with said pointer and with said weighing scale to move said pointer by reason of movements of said scale, said recipe card having stations corresponding with the positions of said pointer and identified with the several ingredients in a recipe, each of said stations being positioned to register with said pointer when the correct amount of the ingredient identified by the particular station has been added to the mixing bowl, and means movable into position to support the weight of said mixing bowl independently of said weighing scale for isolating the vibrations caused by said beater means from said weighing scale.

3. A mixer balance toy comprising the combination of a weighing scale, bearing means supporting said scale for tilting, a mixing bowl on said scale, a recipe card, a pointer movable adjacent said card, means connected with said pointer and with said weighing scale to move said pointer in response to movement of said scale, and said recipe card having stations corresponding with the positions of said pointer and identified with the several ingredients in a recipe, each of said stations being positioned to register with said pointer when the correct amount of the particular ingredient designated by the particular station has been added to the mixing bowl, beater means in overlying relation to said bowl for mixing ingredients in said bowl while said bowl is resting on said scale, support means movable into position to support the scale means independently of said bearing means, whereby to shield said bearing means from the weight of said bowl and its contents and from the vibrations set up by the means for mixing ingredients in said bowl.

4. A mixer balance toy comprising a base, a beam fulcrumed on said base, a mixing bowl supported on said beam, a spring positioned to oppose the weight of said bowl, means to adjust the pressure of said spring, a beater head supported from said base above said bowl, beaters on said head projecting into said bowl, said head being movable into a position to withdraw said beaters from said bowl, an indicator housing, a pointer in said housing, a recipe card in said housing and having a dial portion providing a series of stations corresponding to ingredients in a recipe and including instructions for operation of said beaters, means connected to said pointer and to said beam for actuating said pointer in accordance with movements of said beam, said stations being so positioned as to register with the positions of said pointer as the correct amounts of the ingredients corresponding to said stations are added to the mixture.

5. A mixer balance toy comprising a base, a beam, fulcrum means on said base, on which said beam is supported, a mixing bowl supported on said beam, a spring positioned to oppose the weight of said bowl, means to adjust the pressure of said spring, an indicator housing, a pointer in said housing, a recipe card in said housing and having a dial portion on which indications are made by said pointer, a beater head supported from said base and having beaters projecting into said bowl, support means movable into a position to support said beam independently of said fulcrum means, and said indicator housing having another compartment for storing a plurality of additional recipe cards.

6. A mixer balance toy comprising a base, a scale mounted on said base, a mixing bowl on said scale, an indicator housing, a pointer in said housing, a recipe card in said housing having a dial portion on which indications are made by said pointer, a beater head supported from said base above said mixing bowl, beaters on said head projecting into said bowl, said head being movable into a position to withdraw said beaters from said bowl, a crank on said head, gearing within said head arranged to rotate said beaters in response to rotation of said crank, said gearing having one position giving a predetermined speed ratio between said crank and said beaters and another position giving a different speed ratio between said crank and said beaters, means to shift said gearing to afford the desired ratio between said crank and said beaters, and said beaters being removable from said head for cleaning, said indicator housing having another compartment for storing a plurality of additional recipe cards, and support means movable into a position to support said scale when said beater head is in use.

7. A mixer balance toy comprising a base, a scale mounted on said base, a mixing bowl on said scale, a beater head supported from said base and having beaters projecting into said bowl, an indicator housing, a pointer in said housing, a recipe card in said housing and including an exposed upper dial portion providing a series of stations corresponding to ingredients in a recipe and an exposed lower portion including a printed recipe, means connected to said pointer and to said scale for actuating said pointer in accordance with movements of said scale, said stations being so positioned as to register with the positions of said pointer as the correct amounts of the ingredients corresponding to said stations are added to the mixture, said indicator housing having another compartment for storing a plurality of additional recipe cards, and support means movable into a position to support said scale when said beater head is in use.

8. A mixer balance toy comprising a base, a scale mounted on said base, a mixing bowl on said scale, a beater head supported from said base and having beaters projecting into said bowl, an indicator housing, a recipe card in said housing and having a dial portion, on which indications are made by said pointer, said indicator housing and said recipe card being segmental in shape and said indicator housing providing a special compartment for storing a plurality of additional recipe cards wherein said cards have side edges bearing upon the side edges of said compartment whereby to determine the up-and-down positioning of said cards, said compartment being open at the top and providing a finger hole in one face thereof positioned to register with the lower edges of the cards in said housing, to provide for insertion of a finger to raise said cards into position for access from above the open top of said housing, and support means movable into a position to support said scale when said beater head is in use.

9. A mixer balance toy comprising a base, a bearing mounted on said base, a scale mounted on said bearing, a mixing bowl on said scale, a beater head supported from said base and having beaters projecting into said bowl, an indicator housing, a pointer in said housing, a recipe card in said housing having a dial portion on which indications are made by said pointer, means connected with said scale and with said pointer for actuating said pointer in response to movement of said scale, said indicator housing having another compartment for storing a plurality of additional recipe cards, and support means movable into position to support the scale from said base, independently of said bearing, whereby to isolate said bearing from the weight of said bowl and its contents, and from the vibrations set up by the action of said beaters in said bowl.

References Cited in the file of this patent

UNITED STATES PATENTS

| | | | |
|---|---|---|---|
| Re. 17,819 | Brumser | | Oct. 7, 1930 |
| 586,141 | Nichols | | July 13, 1897 |
| 999,339 | Reeves | | Aug. 1, 1911 |
| 1,622,113 | Hem | | Mar. 22, 1927 |
| 2,036,635 | Kingsbury | | Apr. 7, 1936 |
| 2,047,288 | Phillips | | July 14, 1936 |
| 2,515,755 | Krause | | July 18, 1950 |
| 2,564,361 | Hanssen | | Aug. 14, 1951 |
| 2,738,959 | Schott | | Mar. 20, 1956 |
| 2,812,166 | Angelis et al. | | Nov. 5, 1957 |

FOREIGN PATENTS

| 23,975 | Sweden | Oct. 5, 1906 |
|---|---|---|